(12) United States Patent
Goel

(10) Patent No.: US 7,174,008 B2
(45) Date of Patent: Feb. 6, 2007

(54) METHOD AND SYSTEM FOR MANAGING THE DURATION AND COST OF A TELEPHONE CALL

(75) Inventor: Pradeep K. Goel, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 655 days.

(21) Appl. No.: 10/449,035

(22) Filed: May 30, 2003

(65) Prior Publication Data

US 2004/0240649 A1 Dec. 2, 2004

(51) Int. Cl.
*H04M 15/00* (2006.01)
(52) U.S. Cl. .............................. 379/114.01; 379/114.03; 379/114.06; 379/127.04; 379/130
(58) Field of Classification Search ................ 379/111, 379/114.01, 114.02, 114.03, 114.06, 114.09, 379/114.28, 115.01, 115.02, 115.03, 127.04, 379/130

See application file for complete search history.

(56) References Cited

U.S. PATENT DOCUMENTS

| | | | |
|---|---|---|---|
| 5,930,343 A * | 7/1999 | Vasquez ................. | 379/114.01 |
| 5,978,455 A * | 11/1999 | Johnson et al. ............ | 379/111 |
| 6,023,499 A * | 2/2000 | Mansey et al. ............ | 379/111 |
| 6,104,792 A * | 8/2000 | Lautenschlager et al. ... | 379/130 |
| 6,263,058 B1 * | 7/2001 | Lautenschlager et al. ..................... | 379/114.29 |
| 6,311,054 B1 * | 10/2001 | Korpela ...................... | 455/406 |
| 6,442,260 B1 * | 8/2002 | Simonen ..................... | 379/130 |
| 6,654,599 B1 * | 11/2003 | Lundström et al. ......... | 455/405 |
| 6,704,563 B1 * | 3/2004 | Senn et al. .................. | 455/406 |
| 6,856,675 B1 * | 2/2005 | Kaiser ......................... | 379/130 |
| 6,928,150 B2 * | 8/2005 | Johnston ................ | 379/114.01 |
| 2003/0112932 A1 * | 6/2003 | Johnston ................ | 379/114.01 |

* cited by examiner

*Primary Examiner*—Binh K. Tieu

(57) ABSTRACT

A method for establishing a call between a calling party and at least one called party via a call switching network. The method includes calculating a call charge per minute rate based upon a number of rate-determining parameters, notifying the calling party of the call charge per minute rate, receiving input from said calling party based upon the call charge per minute rate; timing the call, calculating the balance available for the call, informing the calling party of the balance in real time, and disconnecting the call when the call balance is zero.

12 Claims, 2 Drawing Sheets

METHOD AND SYSTEM FOR MANAGING THE DURATION AND COST OF A TELEPHONE CALL

FIELD OF THE INVENTION

The present invention relates to telecommunications in general, and more particularly, to a system and method for allowing a calling party to specify the duration or total cost of a telephone call.

BACKGROUND OF THE INVENTION

As most prospective and existing cellular subscribers know, calling plans can often be quite confusing. Although wireless companies generally offer bundles of minutes for a flat rate, the charge for each call may still vary based upon a number of variables such as peak time/off-peak times, extra minute charges, roaming charges, directory assistance fees and mutual agreements between service providers. Thus, the wireless subscriber may have no idea how much a certain call will end up costing beyond the flat rate. Likewise, for Public Switched Telephone Network (PSTN) subscribers, it may be difficult to find up-to-date information concerning costs for local toll calls or a long distance calls, particularly international calls. Calling charges are often a function of such factors as the respective locations of the calling and called parties, the time and day, and the various agreements between the service providers, among other things.

Further, in many developing countries, phone calls are often made at Public Call Offices (PCOs), which are spread out all over the country so that people who do not have phone service at their home (or those who do not subscribe to long distance service) can make outgoing calls (both voice and data). PCOs, which can be owned and operated by private individuals or the government, allow people in even the most remote locations to connect via telephone, fax, and the Internet. Callers using PCOs sometimes make their calling decisions based upon the amount of money he or she has and would like to spend on the call. It may be difficult to predict how much a given call is going to cost, since the rates are constantly changing.

Thus, there is a need in the art providing a system and process whereby a caller may be able to know the call charge per minute rate before the call is connected and thus be able to specify either the duration or total cost of the call.

SUMMARY OF THE INVENTION

In accordance with one aspect of the invention, a method of establishing a call between a calling party and at least one called party via a call switching network is provided. The method includes calculating a call charge per minute rate based upon a number of rate-determining parameters, notifying the calling party of the call charge per minute rate, receiving input from said calling party based upon the call charge per minute rate; timing the call, calculating the balance available for the call, informing the calling party of the balance in real time, and disconnecting the call when the call balance is zero.

In accordance with another aspect of the present invention, a switching network for establishing a call between a calling party and at least one called party. The switching network including switches, at least one real-time call charge computing devices, and at least one database for storing call charge computing information.

BRIEF DESCRIPTION OF THE DRAWINGS

The drawings are only for purposes of illustrating preferred embodiments and are not to be construed as limiting the invention. The invention may take form in various components and arrangements of components, and in various steps and arrangements of steps, the preferred embodiments of which will be illustrated in the accompanying drawings wherein.

DETAILED DESCRIPTION OF THE INVENTION

It is understood that the specific devices and processes illustrated in the attached drawings and described in the following specification are simply exemplary embodiments of the inventive concepts defined in the appended claims. Therefore, specific examples and characteristics related to the embodiments disclosed herein are not to be considered as limiting, unless the claims expressly state otherwise.

Figure 1:
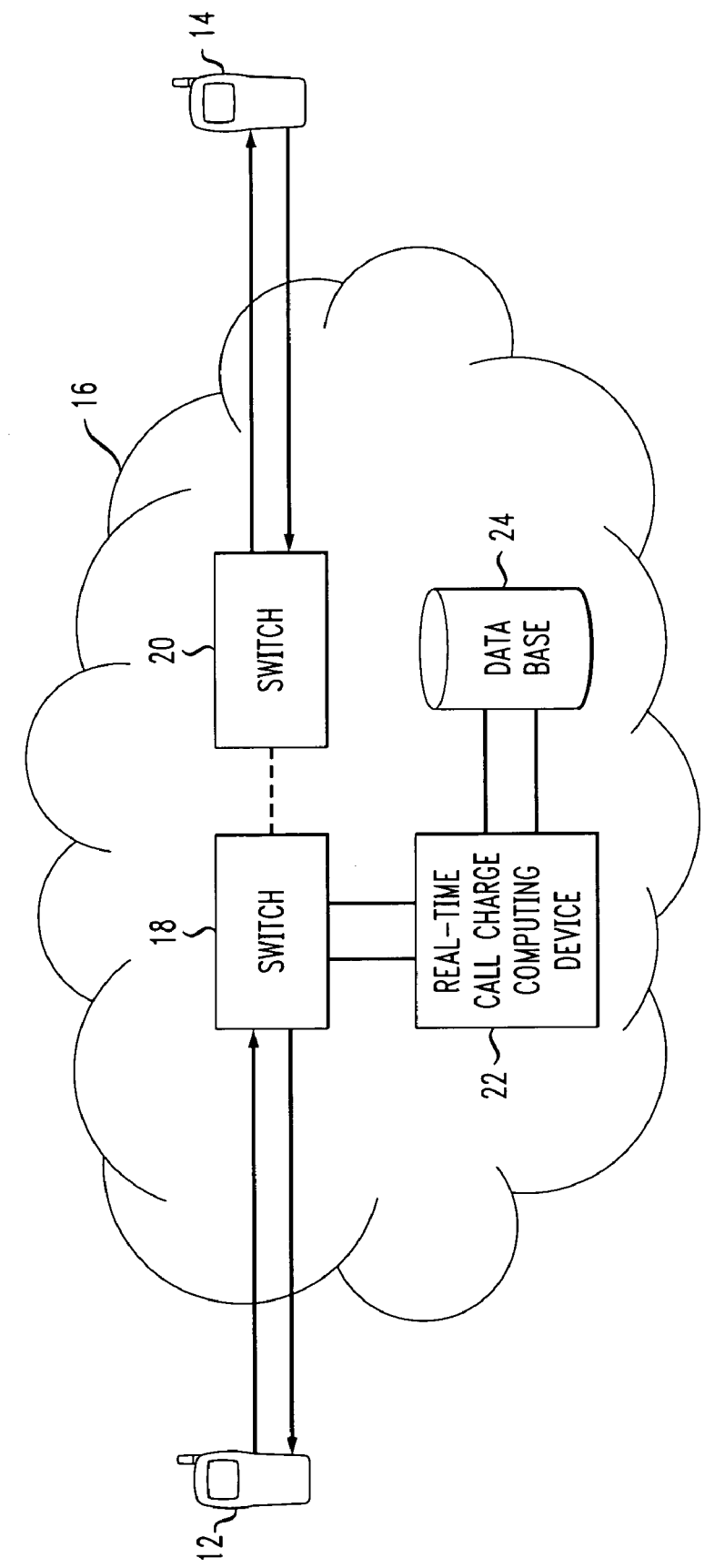
FIG. 1 is a block diagram illustrating a telecommunications network according to an exemplary embodiment of the present invention; and, FIG. 2 is a flow chart of the operation of the illustrative embodiment of the present invention.

FIG. 1 illustrates an exemplary embodiment of a telecommunications system 10 for allowing a calling party 12 to specify the duration or the total cost of a call. In particular, a call may be established between the calling party 12 and a called party 14 via a switching network 16. The parties 12, 14 may be mobile, PSTN or fixed wireless users, and there may be additional called parties, depending upon the equipment and services being used (e.g., teleconferencing).

The switching network 16 includes a call origination switch 18 and a call destination switch 20. If a mobile call is involved, the switches 18, 20 may be part of at least one Mobile Switching Center. The purpose of the switches 18, 20 is to provide a path for the call. To process the call, the switches 18, 20 perform three main functions: (1) identifying the customer, (2) setting up the communication path, and (3) supervising the call. The call origination switch 18 is in communication with the calling party 12, while the call destination switch 20 is in communication with the called party 14. As is well known in the art, there may be additional switches and other network components between the switches 18, 20, depending upon the size of the switching network 16 and other factors.

The call origination switch 18 is also in communication with a real-time call charge computing device 22. The computing device 22 is a hardware platform for computing the calling charge per minute rate in real-time, and the computing device 22 may be any known means for processing information, such as a microprocessor based personal computer or a server. There may be additional computing devices 22 in the system 10, depending upon the needs of the system 10.

At least one database 24 is in communication with the computing device 22. The database 24 stores information for use by the computing device 22 in computing the calling charge per minute rate in real-time. The database 24 is typically a dedicated database for the purpose of storing call charge computing information. However, the database 24 can also be any known entity within the switching network 16 which contains useful information concerning calls, such as a home location register (HLR) in a wireless network.

Figure 2:
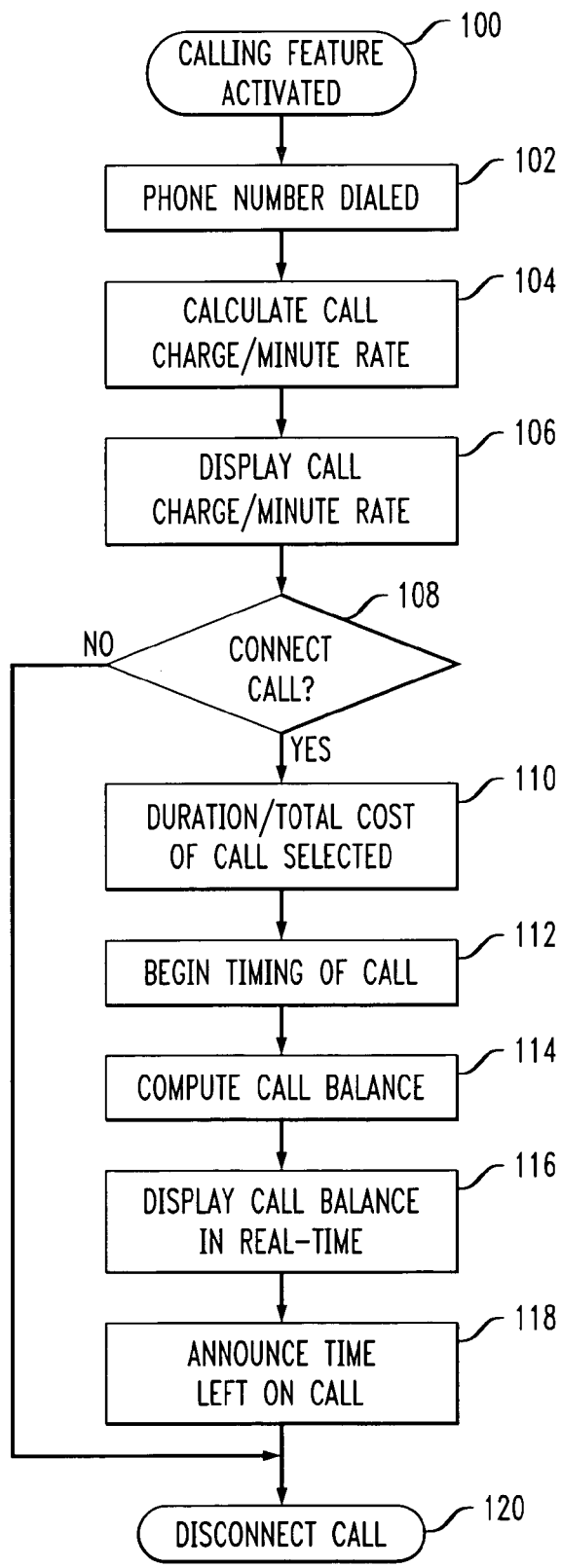

With reference to FIGS. 1 and 2, the manner of operation of the telecommunications system 10 is now explained. The process is initiated when the calling party 12 activates the call duration (or total cost) specification feature of the present invention (100). The activation of this novel call feature by the calling party 12 can be made by any known method in the art, such as by entering a Feature Service Code (e.g., *xx, where x can be any digit between 0 and 9) on the handset. Next, the calling party 12 dials the telephone number of the called party 14 (102) through user equipment and is connected to the call origination switch 18. As a result, the computing device 22 calculates the call charge per minute rate based upon call charge information stored in the database 24 (and possibly other databases), including, but not limited to, the location of the respective parties 12, 14, the type of call (i.e., Mobile-to-Mobile, Mobile-to-PSTN, Mobile-to-Fixed Wireless, PSTN-to-Mobile, PSTN-to-Fixed Wireless, PSTN-to-PSTN, Fixed Wireless-to-Mobile, Fixed Wireless-to-PSTN, Fixed Wireless-to-Fixed Wireless), whether it is a voice or data call, the time and day of the call, and/or mutual charging agreements among the service providers handling the call (104).

The computing device 22 receives the necessary information from the database 24 for calculating the call charge per minute rate by any known method in the art. For example, if the calling party 12 is making a mobile call, the call origination switch 18, which would be part of a Mobile Switching Center, determines where the call is coming from. If the calling party 12 is out of the home area, the switch 18 sends out a request to another database for information in addition to that found in database 24 in order to process the call and calculate the cost of the call. Other databases in the switching network 16 are queried for information about the call, which information is relayed back to the switch 18. The information is then sent by the switch 18 to the computing device 22 for further processing. Communications between the components are based upon known protocols and signaling, including SS7.

Once the calculation has been made, the calling party 12 is then informed of the call charge per minute rate in the form of a display on the handset (106). Based upon this information, the calling party 12 decides whether the call should be connected (108). If the answer to that question is "no," then the call is disconnected (120). Otherwise, the calling party 12 specifies the total length of the call (in minutes) (110). This information can be entered by any known method, such as pressing keys on the handset or with operator assistance. Likewise, the calling party 12 could select the total cost of the call in the applicable currency and enter that information instead.

If the calling party 12 desires to have the call go through, the computing device 22 begins timing the length of the call (112), based upon the input from the calling party 12 (duration of call or total cost). The timing of the call can be made with any known timing means in the art. Also, during the call, the call balance is to be computed based upon any known formula in the art for determining the cost of a call (114). For example, the call balance may be computed according to the following formula:

$$\text{Initial fixed duration of call} - [(\text{call charge per minute rate} * \text{time elapsed}) + \text{applicable service charge(s)}]$$

During the call, the calling party 12 is informed of the call balance in real-time through the handset (116). The call balance can be displayed in any known manner, such as in minutes or in ten cent increments (if in U.S. dollars).

During the call, the parties 12, 14 may hear an audio message, such as a beep or tone, or they may see a visual display on their respective handsets, announcing that there are x number of minutes left on the call, where x=1, 2, . . . n. (118). When the call balance reaches zero, the call is automatically disconnected by any known method in the art (120). At that point, the calling party 12 can pay for the call in a number of ways. For example, if the call was made at a PCO, the calling party 12 would pay the PCO immediately with cash, check or credit card. If the calling party 12 is a wireless or PSTN customer, the call could be added to the monthly bill or the calling party 12 could pay for the call over the phone by credit card with operator assistance.

The invention has been described as a reference to the preferred embodiments. Obviously, modifications and alterations will occur to others upon reading and understanding the preceding detailed description. It is intended that the invention be construed as including all such modifications and alterations insofar as they come within the scope of the appended claims or the equivalence thereof.

What is claimed is:

1. A method of establishing a call between a calling party and at least one called party via a switching network, comprising:
   calculating a call charge per minute rate based upon a plurality of rate-determining parameters;
   notifying said calling party of said call charge per minute rate;
   receiving input from said calling party based upon said call charge per minute rate;
   timing said call;
   calculating the balance available for said call;
   informing said calling party of said balance in real time in minutes or in monetary increments during said call; and,
   disconnecting said call when said call balance reaches zero.

2. The method defined in claim 1 wherein said plurality of rate-determining factors comprises the location of said calling and said called parties, the type of call being made, whether said call is a voice or a data call, the time and day of said call, and mutual charging agreements among the service providers handling said call.

3. The method defined in claim 1 wherein said switching network includes a plurality of real-time call charge computing devices for calculating said call charge per minute and for timing said call.

4. The method defined in claim 3 wherein said switching network further includes a plurality of databases in communication with said real-time call charge computing devices for storing call charge computing information.

5. The method defined in claim 1 wherein said notifying step includes notifying said calling party with a visual message.

6. The method defined in claim 1 wherein said input from said calling party comprises the maximum total cost for said call.

7. The method defined in claim 1 wherein said input from said calling party comprises the maximum length of time for said call in minutes.

8. A system for establishing a call between a first party and at least one called party via a switching network, comprising:
   calculating means for calculating a call charge per minute rate based upon a plurality of rate-determining parameters;
   notifying means for notifying said calling party of said call charge per minute rate;

receiving means for receiving input from said calling party;

timing means for timing said call;

calculating means for calculating the balance available for said call;

informing means for informing said calling party of said balance in real time in minutes or in monetary increments during said call;

disconnecting means for disconnecting said call.

9. The system defined in claim 8 wherein said plurality of rate-determining factors comprises the location of said calling and said called parties, the type of call being made, whether said call is a voice or a data call, the time and day of said call, and mutual charging agreements among the service providers handling said call.

10. The system defined in claim 9 wherein said switching network includes a plurality of real-time call charge computing devices for timing said call.

11. The system defined in claim 10 wherein said switching network further includes a plurality of databases in communication with said real-time call charge computing devices for storing call charge computing information.

12. A switching network for establishing a call between a calling party and at least one called party, comprising;

a plurality of switches, said plurality of switches including a call origination switch in communication with said calling party and a call destination switch in communication with said at least one called party;

a plurality of databases for storing call charge computing information, said call charge computing information comprises the location of said calling and said called parties, the type of call being made, whether said call is a voice or a data call, the time and day of said call, and mutual charging agreements among the service providers handling said call; and a plurality of real-time call charge computing devices in communication with said plurality of databases and said call origination switch, wherein said charge computing devices are operative to calculate the call charge per minute rate and to provide call balance information in real time in minutes or in monetary increments during said call.

* * * * *